Figure 1:
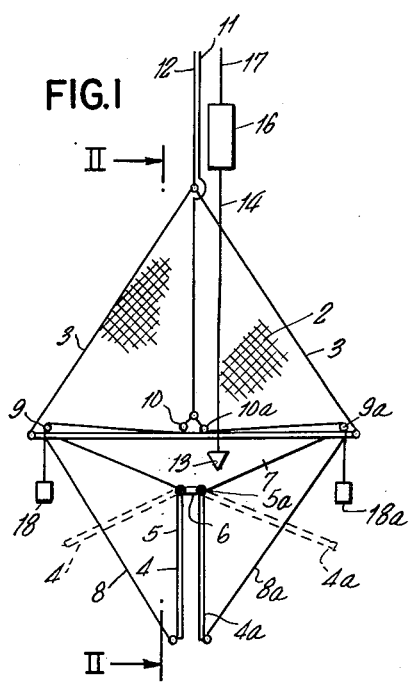

May 14, 1963 J. DETHLOFF 3,089,274
FISHING METHOD AND APPARATUS
Filed Nov. 24, 1959 2 Sheets-Sheet 1

May 14, 1963   J. DETHLOFF   3,089,274
FISHING METHOD AND APPARATUS
Filed Nov. 24, 1959   2 Sheets-Sheet 2

United States Patent Office 3,089,274
Patented May 14, 1963

3,089,274
FISHING METHOD AND APPARATUS
Jürgen Dethloff, Avenariusstrasse 30,
Hamburg-Blankenese, Germany
Filed Nov. 24, 1959, Ser. No. 855,033
Claims priority, application Germany Nov. 26, 1958
13 Claims. (Cl. 43—4.5)

My invention relates to methods and means for commercial fishing, and more particularly, though not exclusively, to fishing at sea.

Commercial fishing is carried out, as a rule, by trawlers operating with drag nets or purse seines. The vessel tows the trailing net, generally just above sea bottom, with the large net opening kept apart by trawl (otter) boards. The fish entering the net assembly collect at the cod end, i.e. the rear part of the net. On uneven ground the net is liable to be damaged so that it is infeasible to employ this fishing method above reefs or on rocky ground. The size of the trawl net is limited because when a certain volumetric capacity, about 10 to 20 metric tons, is exceeded, the net will tear when hoisted. The capacity, therefore, is largely determined by the tensile strength of the net material. Nevertheless, hauling-in of the nets often is difficult and may cause excessive wear or damage to the net. When the cod end is too full, the net will tear and the catch may be partly or entirely lost. During the flurry of the fish in the cod end they often suffer injury and the quality of the catch is decreased by muscle fatigue. Furthermore, despite the use of modern submarine fish-locating instruments, trawl fishing remains a half-blind fishing method.

It is an object of my invention to provide a fishing method and fishing equipment which eliminates the above-mentioned deficiencies and which is suitable for fresh water as well as for sea fishing. It is another, related object of my invention to provide economical and reliable means for deep sea fishing above rough sea bottom and below the maximum depth of trawl fishing.

To achieve these improvements, and in accordance with a feature of my invention, the fishing method is performed as follows. A mesh-work generally in the form of a downwardly open bell structure and having a closeable mouth at the bell bottom, is lowered from the fishing vessel to a location above the fish to be caught, preferably after the location of a school of fish has been determined by echo-sounding or other fishing-locating devices. Thereafter, an electrotaxis electrode is lowered beneath the bell mouth to the location of the fish and is thereafter raised into the bell space with the result that a large number of the fish will follow. Thereafter, the bell mouth is closed, and the bell structure is hoisted up to the fishing vessel with the fish caught therein.

The fish-attracting device to be lowered beneath the open-mouthed bell is the anode of an electric pulse system whose cathode is immersed in the water somewhere in the vicinity of the bell, the particular cathode location being not critical. The cathode may be located 10 to 25 meters away from the anode, preferably above the bell structure. By issuing electrotaxis pulses between the two electrodes while the anode is being lifted from below into the space of the bell, an optimum number of fish are entrained into the bell space before closing the bell mouth.

According to another feature of my invention, the bell-like structure comprises a rigid frame whose upper side is covered by a net, and whose bottom is equipped with drop doors so hinged as to permit closing the net-bell space. The electrotaxis anode or a plurality of such anodes are normally located within the bell space so that at least one of them can be lowered as described above. The output intensity and duration of the electrical pulses to be issued through the water is preferably adapted by electric adjusting means to the kind or size of fish to be caught.

Figure 2:
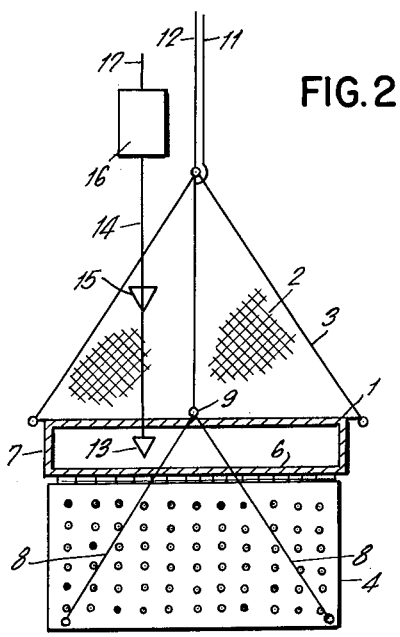
Figure 3:
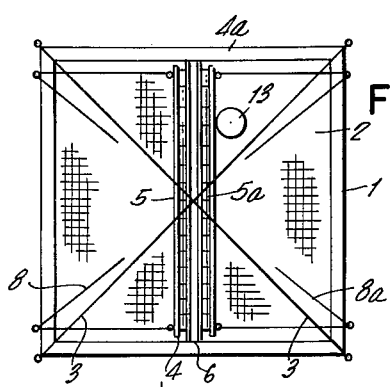
Figure 1A:
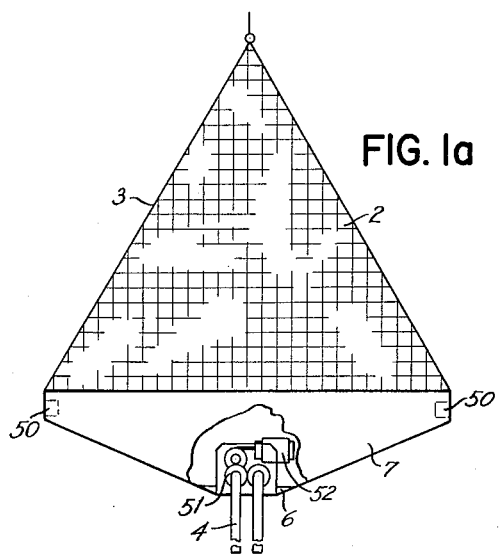

The invention will be further explained with reference to the accompanying drawing in which FIGS. 1 and 1a are front views of an apparatus embodying the invention; FIG. 2 is a cross section along the line II—II of FIG. 1; and FIG. 3 is a top view of the apparatus in FIGS. 1 and 2. FIGS. 1a and 2 do however include slight modifications of the apparatus in FIG. 1 as will be further explained.

Figure 4:
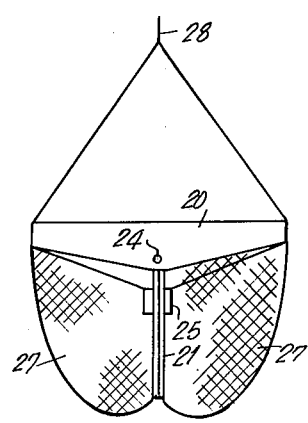
Figure 5:
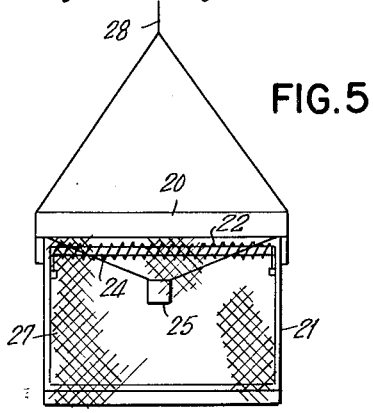
Figure 6:
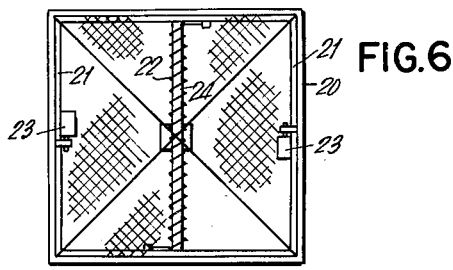
Figure 7:
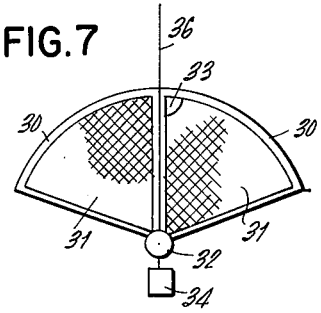
Figure 8:
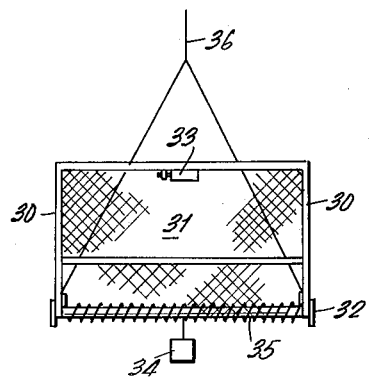
Figure 9:
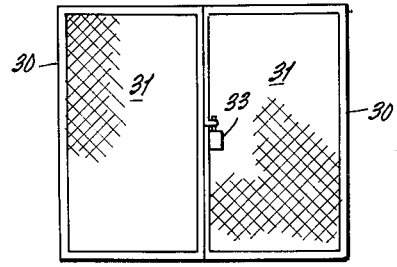
Figure 10:
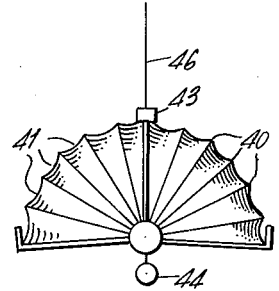
Figure 11:
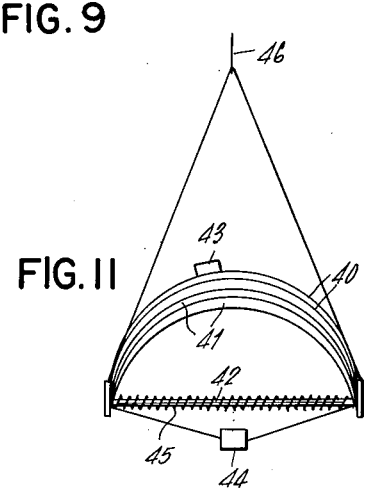

FIGS. 4, 5 and 6 are front, side, and top views, respectively, of another embodiment. FIGS. 7, 8 and 9 are front, side, and top views, respectively, of a third embodiment; and FIGS. 10 and 11 are front and side view, respectively, of a fourth embodiment.

The apparatus according to FIGS. 1, 2 and 3 comprises a horizontal rectangular rigid frame structure 1 consisting, for example, of corrosion-resistant steel. Fastened to the top of the frame structure in the shape of a tent is a net bell 2 of textile meshwork as usually employed for fishing nets. The bell net and the frame are attached to ropes 3 forming the corners of the tent-shaped structure.

Two triangular sheets 7, 7a are secured to the bottom of the frame 1 at opposite respective sides thereof. Preferably they are integral downward extensions of two opposite sides of the frame 1. A hinge beam 6 is mounted between the bottom apexes of the triangular sheets 7, 7a and carries two hinges 5, 5a along its length. Two rectangular drop doors 4, 4a are pivotally mounted across the bottom side of the frame structure 1 by means of the respective hinges 5 and 5a. The drop doors 4, 4a, articulate downwardly by way of the force of gravity to the position in FIGS. 1 and 2. Two pairs of tow lines 8, 8a joined to the bottom of the doors 4, 4a respectively can be drawn upwardly to draw the doors to a closed position angularly resting against the frame 1. As a result, the drop doors, when closed against the frame, occupy a slanting or diagonal position and thus reduce the pressure upon the drop doors when the fish-lift apparatus is in filled condition.

As stated, the doors 4, 4a are closed against the frame 1 by drawing them up by means of two pairs of tow lines 8, 8a which are lashed to the lower rim of the bottom corners of the respective doors 4, 4a, thus permitting the lower door rims to lie tightly against the frame 1 when the doors are closed. Shown by broken lines in FIG. 1 is an intermediate position of the respective doors. For reducing the water resistance, the doors are preferably provided with perforations large enough to let the water pass through but not permitting escape of the fish. The pairs of tow lines 8, 8a for moving the doors are joined with a control line 11, such as a rope, cable or wire, and pass over two pairs of guide pulleys 9, 9a journalled at the edge of the frame structure 1 and over further pairs of guide pulleys 10, 10a mounted in the middle of the frame. The control line 11 extends upwardly together with a suspension rope or wire cable 12 to which the guy ropes 3 for the entire apparatus are attached.

Instead of moving the drop doors 4, 4a with the aid of the tow lines 8, 8a, the apparatus may be modified as shown in FIG. 1a. One or more suitable electric motors such as the motor 52 are mounted on the transverse beam 6 of the frame structure to open or close the drop doors under electric control. The motors 52 are geared to the respective doors 4 and 4a by means of intermediate drive gears 51.

An electrode 13, normally located close to the bottom portion of the frame structure 1 is connected with an electric cable 14 which serves for supplying electrotaxis pulse currents and permits lowering and lifting the electrode 13 from aboard ship, to permit lowering the electrode beneath the bell device and thereafter lifting it back into the device for entraining fish as described above. Instead of using such a movable electrode, two or more electrodes may be arranged at respectively different heights, in which case, during fishing operation, the electric pulses are supplied first to the lower electrode or electrodes beneath the bell and thereafter to the higher electrode or electrodes in order to entrain the fish upwardly into the bell space.

In the illustrated embodiment of FIG. 2 another electrode 15 is mounted inside of the bell space. The second electrode cam be switched on while the lower electrode 13 is switched off, thus causing the fish, once they have reached the zone of the bell mouth, to be attracted upwardly toward the top space of the bell.

The pulse generating and controlling equipment usually comprises a rectifier energized from an alternating-current source, a pulse capacitor charged from the rectifier and periodically discharged through the electrodes under control by an ignitron or other electronic switching device; the rectifier, in some cases, being energized through a transformer. Such equipment, as such, is not part of the present invention and is more fully described, for example, in the copending application Serial No. 830,494, filed July 30, 1959 and assigned to the assignee of the present invention. However, since relatively strong cables are required for conducting the pulses from the pulse generator to the electrodes, it is preferable to mount the pulse generating equipment in the vicinity of the net bell in order to reduce the amount of electric supply cables needed. In the illustrated embodiment the pulse generator, enclosed in a housing 16, is mounted on a cable 17 closely above the bell device. This requires using a water and pressure tight housing 16, unless it is preferred to fill the housing with transformer oil or similar liquid. Mounting the pulse generator 16 at this location has the advantage that a simple alternating-current cable 17 of conventional design can be used for supplying the electric current. For better illustration, the electrode 13 with the pulse generator 16 are shown beside the vertical axis of the device and beside the hoisting line 12, while for practical reasons it is preferable to fasten the electrode 13 and the generator 16 to the suspension wire rope 12 in the center of the bell space and above the bell respectively.

To facilitate accurate control of the above-described operation, two telemeters 18, 18a are mounted on, or suspended from, the frame structure 1. These telemeters are short-distance echo sounders of a type available in commerce. They serve for exactly determining the distance between the bottom of the fish lift device and the top area of the school of fish.

It is practical to operate the new fishing gear from aboard a trawler by letting the equipment enter the water via the forecastle or the stern, for instance through a special hole in the ship's bottom which can be closed by hull slide doors. For deep-sea fishing the frame structure 1 of the apparatus may have approximately 4 by 4, or 6 by 6 meters length with a height of the net bell of about 5 meters.

A fish-catching operation with the aid of the equipment described above is performed as follows:

After locating a suitable school of fish by echo sounding, the apparatus is lowered with open drop doors until it is relatively close above the school. It is of advantage to determine the exact distance by means of the short distance echo sounders 18, 18a. Then the electric pulse equipment is switched on and causes immediate electrotaxis of the fish. In intervals of one to two seconds, the movable electrode is pulled upward into the interior of the net bell, or the pulses are switched from the outer electrode 13 to the inner electrode 15.

The entrainment of the fish into the net bell is a matter of several seconds. When the filling degree is sufficient, which can be determined by means of the above-described indicators, the drop doors 4, 4a are closed, the pulse generator is switched off, and the entire equipment is hauled up by a winch. For good quality of the catch, it is usually preferable to stun or kill the fish in the apparatus before hoisting, by means of a pulse sequence of suitable intensity.

It will be apparent that apparatus according to the invention can readily be used above uneven or rock ground without damage to the equipment and that it permits fishing at greater depth than heretofore accessible to trawl fishing, furthermore the net bell is not subjected to tearing even in case of an extremely good catch because the weight of the fish is mainly supported by the solid drop doors.

The above-described method according to the invention can be performed, and the same advantages are obtainable, by means of various other designs of fish-lifting equipment such as described presently, for example, with reference to FIGS. 4 through 11.

The device illustrated in FIGS. 4, 5 and 6 comprises a rigid frame structure 20 with two U-shaped stirrups 21 hinged to a shaft 24 which is carried by the frame structure 20 and extends parallel to one of its center axes. When the device is being lowered into the water by means of a cable 28, the two stirrups 21 are turned and lie against the frame 20 where they are latched by respective electromagnetic latching devices 23 mounted on the frame structure 20. The stirrups 21 are biased by a helical spring 22 mounted on the shaft 24 which tends to fling the stirrups downward to the illustrated position. Mounted beneath shaft 24 is the anode 25 of electrotaxis equipment as described above. After the fish are concentrated by the electric pulses about the anode 25, the latching device 23 is electrically released and the spring 22 rapidly turns the two stirrups 21 downwardly to the closing position. The fish are then caught within the space enclosed by two nets 27 which are fastened to the stirrups and to the frame structure. The two nets 27 are preferably bag-shaped so that the fish stunned or killed by the electric pulses will collect in the lower portion of each net bag. The device is then hoisted aboard ship by means of the cable 28 which may be provided with, or equipped as, an electric cable for supplying the eelctric pulses and, if desired, also the current for operating the latch devices 23.

The device illustrated in FIGS. 7, 8 and 9 comprises two sector-shaped frames 30 generally similar to the bucket portions of a grab bucket. The two frames 30 are covered with nets 31, with the exception of their rectangular bottom surfaces. When the device is being lowered into the water, the bucket frames 30 are turned up on a pivot shaft 32 and occupy the position best apparent from FIG. 7. In this position the buckets are latched to each other by an eelctromagnetic latching device 33. The anode 34 is suspended beneath the pivot shaft 32. After the fish are concentrated by the electric pulses about the anode 34, the latching device 33 is released so that a spring 35 mounted on shaft 32 rapidly turns the two bucket frames 30 downwardly. The fish are then caught within a space enclosed on all sides by the net and can be hoisted aboard ship by means of the cable 36.

The device illustrated in FIGS. 10 and 11 comprises a number of semicircular frame members 40 which are connected with each other by nets 41 to form a structure generally similar to a Chinese lantern. The frames 40 are rotatable about a common pivot shaft 42. The anode 44 is located beneath the pivot shaft 42. When lowering the device, the semicircular frame members 40 are turned upwardly as shown in FIG. 11, in opposition to the force of a spring 45 on shaft 42. In this position, the frame members are latched together by an electromagnetic latching device 43. After the fish are concentrated by the electric pulses about the anode 44, the latching device 43 is released so that the spring 45 rapidly turns the semicircular frame member 40 downwardly. The fish are then caught within a spherical space enclosed on all sides by the net, and can be hoisted aboard by means of the cable 46.

It will be obvious to those skilled in the art upon a study of this disclosure that my invention permits of various modifications with respect to the design of the bell-type apparatus and hence may be given embodiments other than particularly illustrated and described herein, without departing from the essential features of my invention and within the scope of the claims annexed hereto.

I claim:

1. The fishing method comprising the steps of lowering a meshwork bell having a closeable mouth at the bell bottom to a location above the fish to be caught, issuing electrotaxis pulses by pulse-forming means beneath the bell mouth through the water when the bell approaches to within a predetermined distance from the fish, then raising the pulse-forming means up to within the bell for causing the fish to enter the bell, then closing the bell mouth, and raising the bell with the fish caught therein.

2. The fishing method comprising the steps of lowering a bell net with open drop doors into the water to a location generally above the fish to be caught, lowering an electrotaxis electrode to a location beneath the bell net, energizing the electrode by electrotaxis pulses when the bell approaches to within a predetermined distance from the fish, and lifting the electrode in energized condition up to the interior of the net to thereby cause the fish to enter the net, thereafter closing the doors and raising the closed net bell.

3. The fishing method comprising the steps of lowering a meshwork bell having a closeable mouth at the bell bottom to a location above the fish to be caught, echo-sounding the distance of the bell from the fish, issuing electrotaxis pulses by pulse-forming means through the water at a location beneath the bell when the sounded distance reaches a given optimum range, raising the pulse-forming means up to within the bell for causing the fish to enter the bell, then closing the bell mouth, and raising the bell with the fish caught therein.

4. The fishing method comprising the steps of lowering a meshwork bell having a closeable mouth at the bell bottom to a location above the fish to be caught, issuing electrotaxis pulses by pulse-forming means beneath the bell mouth through the water, then raising the pulse-forming means up to within the bell for causing the fish to enter the bell, sensing the filling degree of the bell space, closing the bell mouth and discontinuing the issurance of electrotaxis pulses after the filling degree reaches a desired value, and thereafter raising the bell.

5. Fishing apparatus comprising a frame, a net attached to said frame on the top side thereof and forming together with said frame a downwardly open bell structure, drop doors hinged to said frame on the bottom side thereof for closing the bell structure from below, a hoisting line attached to said bell structure for lowering and hoisting it from aboard ship, actuator means connected to said doors for closing and opening them, and electrotaxis means for issuing pulses adapted to be moved from beneath said bell structure into the interior of said bell structure.

6. Fishing apparatus comprising a frame, a net attached to said frame on the top side thereof and forming together with said frame a downwardly open bell structure, perforated drop doors hinged to said frame on the bottom side thereof for closing the bell structure from below, a hoisting line attached to said bell structure for lowering and hoisting it from aboard ship, and tow lines attached to said respective doors for simultaneously closing said doors.

7. In fishing apparatus according to claim 6, said frame having two opposite wall portions of triangular shape tapering downwardly toward respective points on a center axis of the frame, said doors having respective hinges extending between said two points whereby said doors, when closed, extend from the frame center axis in respective upwardly inclined directions toward the respective frame sides intermediate said triangular portions.

8. In fishing apparatus according to claim 5, said electrotaxis means comprising an electrode and a hoisting line to which said electrode is attached, said electrode being located in the bell space and being lowerable by means of said line to beneath the bell structure.

9. In fishing apparatus according to claim 5, said electrotaxis means comprising two selectively operable electrodes of which one is mounted in the bell space and the other below said frame.

10. In fishing apparatus according to claim 5, said electrotaxis means comprising an electric pulse-generator unit mounted in the vicinity of said bell structure and hoistable together therewith.

11. Fishing apparatus according to claim 5, comprising short-distance echo sounder means mounted on said frame structure and downwardly oriented for response to vertical distance from a school of fish.

12. The fishing method comprising the steps of lowering a downwardly closeable net structure into the water to a location above the fish to be caught, issuing electrotaxis pulses through the water from an anode within the encloseable net space to a cathode located remote from the net structure for concentrating the fish in said space, then closing the net structure, and raising the net structure with the fish caught therein.

13. Fishing apparatus, comprising rigid frame structure and net means attached to said structure and forming together therewith a downwardly closeable trap space, a hoisting line attached to said structure for lowering and hoisting it from aboard ship, control means for closing said space, and electrotaxis means having a pulse-issuing electrode attached to said structure within said space and an oppositely charged companion electrode located remote from said structure.

References Cited in the file of this patent

UNITED STATES PATENTS

| 796,709 | Cornet | Aug. 8, 1905 |
| 2,603,031 | Haseman | July 15, 1952 |
| 2,795,883 | Ras | June 18, 1957 |

OTHER REFERENCES

Popular Mechanics, February 1952 issue, page 96.